(12) United States Patent
Malackowski et al.

(10) Patent No.: US 8,180,711 B2
(45) Date of Patent: May 15, 2012

(54) INTELLECTUAL PROPERTY TRADING EXCHANGE

(75) Inventors: James E. Malackowski, Chicago, IL (US); Michael J. Lasinski, Chicago, IL (US)

(73) Assignee: IPXI Technologies, LLC, Chicago, IL (US)

( * ) Notice: Subject to any disclaimer, the term of this patent is extended or adjusted under 35 U.S.C. 154(b) by 0 days.

(21) Appl. No.: 12/749,051

(22) Filed: Mar. 29, 2010
(Under 37 CFR 1.47)

(65) Prior Publication Data

US 2010/0262530 A1 Oct. 14, 2010

Related U.S. Application Data

(63) Continuation-in-part of application No. 12/355,530, filed on Jan. 16, 2009, which is a continuation-in-part of application No. 11/405,166, filed on Apr. 17, 2006.

(60) Provisional application No. 60/672,324, filed on Apr. 18, 2005.

(51) Int. Cl.
*G06F 21/00* (2006.01)

(52) U.S. Cl. ........ 705/902; 705/901; 705/910; 705/911; 705/50; 705/51; 705/53; 705/54; 705/57; 380/227; 380/228; 380/229; 380/230; 380/201; 380/202; 380/203; 380/204

(58) Field of Classification Search .................. 705/902
See application file for complete search history.

(56) References Cited

U.S. PATENT DOCUMENTS

| | | |
|---|---|---|
| 5,671,412 A | 9/1997 | Christiano |
| 6,885,999 B1 | 4/2005 | Corless |
| 6,973,444 B1 | 12/2005 | Blinn et al. |
| 7,031,943 B1 | 4/2006 | James et al. |
| 7,043,454 B2 | 5/2006 | Powell |
| 7,082,399 B2 | 7/2006 | Utsumi |
| 7,127,405 B1 | 10/2006 | Frank et al. |
| 7,136,838 B1 | 11/2006 | Peinado et al. |
| 7,260,557 B2 | 8/2007 | Chavez |

(Continued)

FOREIGN PATENT DOCUMENTS

DE 10257159 A1 * 6/2004

(Continued)

OTHER PUBLICATIONS

Wikipedia—Regression Analysis. http://en.wikipedia.org/wiki/Regression_analysis. Retrieved online Jul. 29, 2011.*

(Continued)

*Primary Examiner* — James A Reagan

(57) ABSTRACT

A computerized intellectual property trading exchange is disclosed for facilitating the trading of license contracts relating to intellectual property rights or pools of intellectual property rights. The exchange includes at least one intellectual property license contract relating to intellectual property rights or pools of intellectual property rights and a computer-accessible forum configured to allow a plurality of participants to trade the license contract. The plurality of participants includes at least one seller, which may be the owner, having the license contract and desiring to trade the license contract. The plurality of participants also includes at least one buyer desiring to obtain the license contract. The buyer may be an investor, speculator, market maker, or arbitrageur, who purchases the license contract to achieve appreciation. The buyer also may be a licensee, who purchases the license contract to practice the intellectual property rights.

37 Claims, 3 Drawing Sheets

U.S. PATENT DOCUMENTS

| | | |
|---|---|---|
| 7,272,572 B1 | 9/2007 | Pienkos |
| 7,277,904 B2 | 10/2007 | Baird |
| 7,333,945 B1 | 2/2008 | Alling |
| 7,386,460 B1 | 6/2008 | Frank et al. |
| 7,386,891 B2 | 6/2008 | Peinado |
| 7,421,412 B2 | 9/2008 | Ramanathan |
| 2001/0034695 A1 | 10/2001 | Wilkinson |
| 2002/0002523 A1* | 1/2002 | Kossovsky et al. ............ 705/36 |
| 2002/0004775 A1 | 1/2002 | Kossovsky et al. |
| 2002/0007335 A1 | 1/2002 | Millard et al. |
| 2002/0077835 A1 | 6/2002 | Hagelin |
| 2002/0107809 A1 | 8/2002 | Biddle et al. |
| 2002/0169625 A1 | 11/2002 | Yang et al. |
| 2003/0046238 A1 | 3/2003 | Nonaka et al. |
| 2004/0059678 A1* | 3/2004 | Stefik et al. ............ 705/51 |
| 2004/0220867 A1 | 11/2004 | Messick et al. |
| 2008/0140557 A1 | 6/2008 | Bowlby et al. |
| 2008/0243641 A1 | 10/2008 | Leno |
| 2008/0243642 A1 | 10/2008 | Ramer |
| 2009/0070150 A1 | 3/2009 | Malackowski et al. |

FOREIGN PATENT DOCUMENTS

| | | |
|---|---|---|
| JP | 2007035077 A | 2/2007 |
| JP | 2007035077 A | 2/2007 |

OTHER PUBLICATIONS

PCT International Search Report, dated Dec. 2, 2009, 2 pages.

Non-Final Office Action in U.S. Appl. No. 12/355,530, dated Sep. 9, 2010, 11 pages.

Non-Final Office Action in U.S. Appl. No. 11/405,166, dated Aug. 18, 2010, 20 pages.

Perrit, Henry H., "Knowbots, Permissions Headers and Contract Law", Apr. 30, 1993, http://archive.ifla.org/documents/infopol/copyright/perh2.txt, retrieved online May 4, 2011, 31 pages.

* cited by examiner

INTELLECTUAL PROPERTY TRADING EXCHANGE

CROSS-REFERENCE TO RELATED PATENT APPLICATIONS

The present application is a continuation-in-part of U.S. patent application Ser. No. 12/355,530, filed Jan. 16, 2009, which is a continuation-in-part of U.S. patent application Ser. No. 11/405,166, filed Apr. 17, 2006, which claims the benefit of priority to U.S. Provisional Patent Application No. 60/672,324 filed Apr. 18, 2005, all of which are incorporated by reference herein in their entirety.

BACKGROUND OF THE INVENTION

The present invention relates to a trading exchange and, more particularly, to an exchange and method for trading intellectual property ("IP") rights, including rights in patents, copyrights, trademarks, trade dress, and trade secrets.

The market for IP rights has never been stronger. In 2005, for example, royalties from the licensing of IP rights accounted for more than $100 billion in revenues. Both sellers (or licensors) and buyers (or licensees) of IP rights have had the potential to make substantial gains in recent years because of an increased licensing demand.

Currently, there is no centralized marketplace for carrying out the licensing of IP rights. Rather, an IP owner desiring licensing capital must solicit bids from potential licensees and negotiate a licensing agreement. The transaction is similar to the licensing or sale of any other significant property or asset and may take weeks, months, or even years before any deal closes.

A drawback of the current IP licensing market is that IP owners must actively pursue parties for licensing. This process may be both time consuming and expensive, because IP owners usually are not fully aware of the entire market outside of their competitors and often must dedicate time and money to research the marketplace. Often, IP owners engage in expensive licensing campaigns to determine which parties might benefit from an IP license and then solicit those parties for interest. It is not unusual for licensing campaigns to extend a period of years for identifying and targeting all potential licensees.

Another drawback of the current IP licensing market is determining a value for the IP. After a potential licensee is identified, the IP owner and potential licensee must negotiate a royalty or fixed price for the IP rights. While valuation may be fairly settled in established industries, arriving at a reasonable value for IP related to new or emerging technologies may not be easily accomplished. In any technology, the valuation process may require weeks or even months of negotiating before any licensing agreement is signed. Some valuation methods have expedited this process, such as the methods disclosed by U.S. Patent Application Publication No. 2003/0200104 to Heming et al. ("the Heming Application"). Yet, the Heming Application does not address valuation for new or emerging technologies or the problems described above with determining the licensing market.

In the current IP licensing market, litigation is the only means of recourse an IP owner may have against infringers or parties refusing to accept or pay for licenses. Because of this, the current IP licensing market often is reactive by focusing primarily on parties that already are infringing certain IP rights. For instance, an IP owner may discover that a competitor is making or using a certain patented device. Should licensing negotiations not prove successful (or not even be an option), the IP owner may have to prevail in a patent infringement lawsuit before the IP owner is rightfully compensated for the infringer's use of the patented device. Patent infringement lawsuits often are extremely expensive, sometimes costing multiple millions of dollars, and resolution is seldom quick. In other words, an IP owner may have to spend millions of dollars and wait several years before prevailing in a patent infringement action and finally realizing any financial gain from the IP.

A couple alternatives to the traditional IP licensing market exist, such as patent pools and patent license exchange companies. Patent pools, for instance, collect IP that typically is related to a standard and license it non-exclusively under common terms. Patent license exchange companies, on the other hand, raise money (sometimes as much as hundreds of millions of dollars) to purchase patents and license or enforce them against infringers. While patent pools and patent license exchange companies tend to expedite the traditional IP licensing process, they often do so at the expense of the value of the IP. For example, a patent pool may not receive the maximum value for each patent among the pool. In order to maintain marketability for the entire pool, certain patents within the pool may be considerably discounted or licensed for far less than the market may provide if the discounted patents were licensed individually.

Convenient marketplaces exist for buying and selling (or trading) other types of property rights and assets, such as stocks and other securities, commodities, futures, and even environmental emissions permits. For example, various exchanges, such as the New York Stock Exchange ("NYSE"), actively trade stocks and securities. Other exchanges, such as the Chicago Mercantile Exchange ("CME") actively trade commodities and futures. And while most trading activity today is performed electronically, some exchanges such as the National Association of Securities Dealers Automated Quotations ("NASDAQ") are entirely traded electronically without utilizing a centralized trading floor. These trading exchanges allow for assets such as stocks and securities to be quickly and easily traded, both upon the initial public offering ("IPO") and during subsequent day-to-day transactions. As a result, owners of such assets have an immediate market for trading and do not have to spend months seeking out buyers and negotiating prices.

Presently, there is no convenient, centralized marketplace for trading IP rights. Accordingly, there is a need for an IP licensing marketplace and a method of trading IP rights in an expeditious manner that maximizes the value of the IP.

SUMMARY OF THE INVENTION

In accordance with one aspect of the present invention, a computerized intellectual property trading exchange is disclosed for facilitating the trading of intellectual property rights. The computerized exchange includes at least one unitized intellectual property license contract relating to intellectual property rights or a pool of intellectual property rights, and a computer-accessible forum configured to allow a plurality of participants to trade the unitized license contract. The plurality of participants includes at least one seller having the unitized license contract and desiring to trade the unitized license contract. The plurality of participants also includes at least one buyer desiring to obtain the unitized license contract.

In accordance with another aspect of the present invention, a method is disclosed for trading at least one unitized license contract relating to intellectual property rights or a pool of intellectual property rights by a seller of the unitized license contract to at least one buyer through a computerized intellectual property exchange. The method includes the steps of: storing in a computerized storage device information describing the seller listing the unitized license contract on the computerized intellectual property exchange, storing in a computerized storage device information describing the buyer purchasing the unitized license contract through the computerized intellectual property exchange, and processing in a microprocessor the clearing of the purchase by the buyer of the unitized license contract.

DETAILED DESCRIPTION OF THE INVENTION

Figure 1:
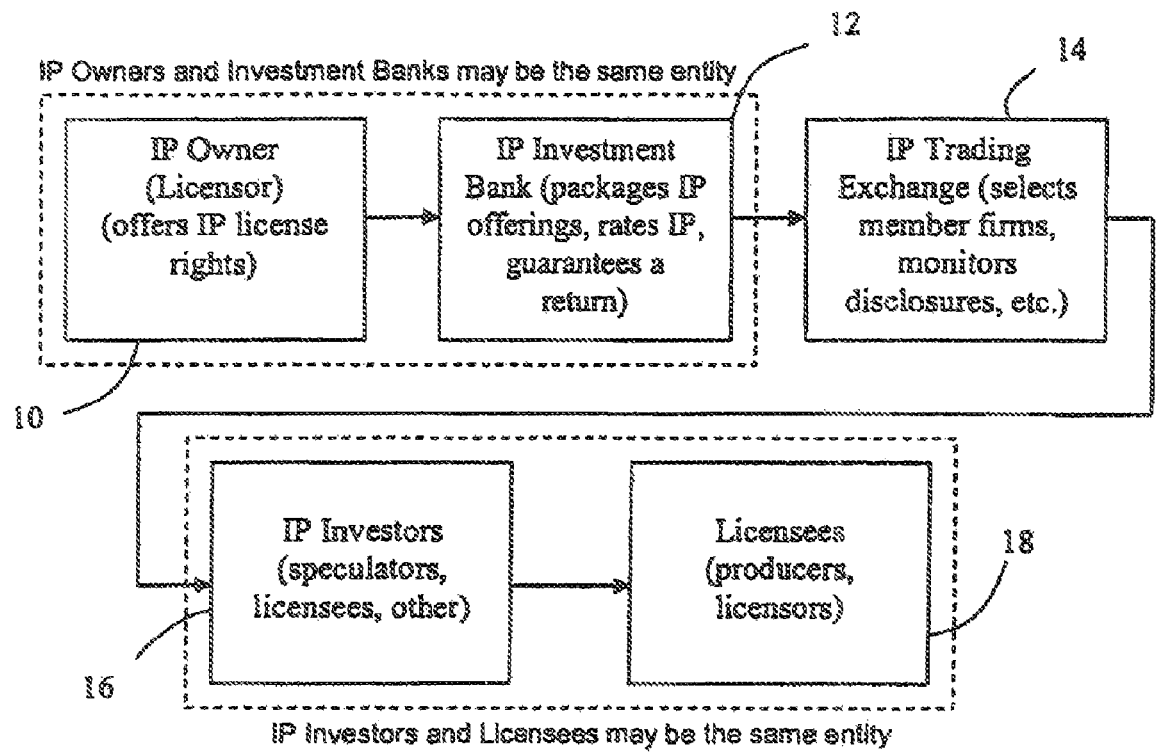
FIG. 1 shows the steps of an initial offering of unitized license contracts on an embodiment of a computerized intellectual property trading exchange of the present invention.

The current market for intellectual property ("IP") and sophistication of current exchanges provide an opportunity to develop efficiencies in the IP marketplace and maximize IP valuation through an IP trading exchange. An IP trading exchange may be used for licensing or selling all types of IP, including patents, copyrights, trademarks, trade dress, and trade secrets. Moreover, in one embodiment of the present invention, the IP may include issued patents, registered copyrights, registered trademarks, or any other granted or registered IP. In another embodiment of the present invention, the IP may include pending patent applications, pending trademark applications, or any other pending IP application or registration. In yet another embodiment of the present invention, the IP may include a pool or plurality of issued patents or pending patent applications, registered copyrights, registered trademarks or pending trademark applications, or any other pending, granted or registered IP.

An IP trading exchange offers a forum in which IP owners, licensees, or financial investors or speculators may buy or sell IP rights through licenses and/or related futures contracts. For example, in accordance with one embodiment of the present invention, an IP trading exchange may be used to buy or sell IP rights through licenses, which may then be used to practice the invention or legitimize current operations that may be infringing. In accordance with another embodiment of the present invention, an IP trading exchange may be used to buy or sell speculative IP rights through futures contracts, the goal of which is to earn appreciation by re-selling for a higher price at some time in the future. In accordance with still another embodiment of the present invention, an IP trading exchange may be used to buy or sell a pool of IP rights, said IP pooled by said seller and licensed to said buyer.

Key Elements of a Computerized IP Trading Exchange

Following are descriptions of key elements of a computerized IP trading exchange in accordance with one or more embodiments of the present invention. A computerized IP trading exchange may have some or all of these elements, as well as any additional elements necessary for the setup, execution, and daily operation of a computerized IP trading exchange.

Intellectual Property. Intellectual property ("IP") includes patents, copyrights, trademarks, trade dress, trade secrets, and any other intangible ideas or expressions. IP is a form, of legal entitlement, which allows its owner or holder to control the use, manufacture, or sale of the IP. For example, a patent allows the owner or holder to exclude others from practicing an invention. Manufacturers and other potential holders gain the right to practice an excluded invention by licensing or purchasing the rights from a patent owner. In an IP trading exchange, certain IP is accepted for listing on the exchange, as described below.

IP Owner. The IP owner (licensor) provides licensing and sub-licensing rights to licensees in exchange for royalties or other compensation as stipulated by the license agreement. In accordance with one embodiment of the present invention, an IP owner licenses the IP to an investment bank in exchange for a cash payment. In accordance with another embodiment of the present invention, an IP owner performs the listing and underwriting of IP license contracts itself and without the assistance of an IP investment bank. The IP owner may include multiple individuals and/or entities. For instance, the IP owner may include all of the owners of various intellectual property rights relating to a specific product or industry.

IP Investment Bank. In accordance with one or more embodiments of the present invention, investment banks receive the IP rights from the IP owner and package them for listing or inclusion on the IP trading exchange. Specifically, an investment bank rates, insures, and values the IP, as described below. Additionally, the investment bank may perform other functions such as underwriting the licensing transaction, or the IP investment bank may work with a separate underwriter or an underwriting syndicate to carry out the underwriting processes. Further, the investment bank may certify that IP license contracts comply with the regulations of trading and the requirements of listing on the IP trading exchange. The investment bank may then list the IP on the IP trading exchange and sub-license the IP to perspective buyers. In another embodiment of the present invention, the IP investment bank may have the right to enforce the IP should an infringer not purchase a license from the IP trading exchange. The IP owner may choose to join the IP investment bank in any enforcement proceedings if desired or if necessary.

Underwriter. The IP investment bank and/or IP trading exchange may retain a separate underwriter or an underwriting syndicate to carry out the due diligence and underwriting processes. Alternatively, the underwriting process may be carried out by one or more of the IP owner, IP investment bank, and/or IP trading exchange. The underwriter reviews information relating to the intellectual property submitted by the IP owner and evaluates the deal, performs due diligence, and may recruit a syndicate. The underwriter may negotiate an underwriting agreement with the IP investment bank and/or IP trading exchange, and based on the agreement, the underwriter may purchase a certain volume of the intellectual property licensing contracts as part of the initial sale or offering.

Computerized IP Trading Exchange. The computerized IP trading exchange monitors disclosures and may guarantee and/or clear transactions similar to today's commodities and futures exchanges, in addition to other functions performed by today's exchanges. The IP trading exchange may monitor and/or enforce regulations relating to trading, including regulations created by the exchange as well as governmental regulations. Further, the IP trading exchange may monitor and/or enforce requirements for listing IP license contracts on the exchange. After the initial offering, IP pricing is achieved by continuous or day-to-day trading, as described below. The IP trading exchange keeps track of pricing information and provides pricing information on a realtime basis. Pricing information may be provided in any print (e.g., newspaper, facsimile) or electronic (e.g., ticker, RSS feed, webstream, e-mail, interne webpage) medium. Additionally, the IP trading exchange may provide pricing information in the form of industrial averages or indices, which may be based on average pricing information for license contracts relating to various technologies, industries, and/or companies.

The IP trading exchange is computerized and IP owners, IP investment banks, IP investors, and licensees can access the IP trading exchange through the internet by accessing a website of the IP trading exchange, through other computerized systems or networks such as NASDAQ and/or the NASDAQ portal, and/or through other online connections or portals. The IP trading exchange may have an independent computerized platform with its own servers and databases. In another embodiment, the IP trading exchange is hosted on third-party networks or computerized systems. As one example, the IP trading exchange may be implemented on a hosted network with information stored on one or more databases that may be part of the hosted network or may be accessible to but separate from the hosted network.

The IP trading exchange maintains electronic information relating to the unitized license contracts that are listed on the exchange. The IP trading exchange also maintains electronic information relating to the IP owners, IP investment banks, IP investors, and licensees. The information is stored in one or more databases maintained by or at the direction of the IP trading exchange.

IP Investors. IP investors (which may include speculators, market makers, and arbitrageurs) add liquidity to the market. IP investors purchase IP licensing and/or futures contracts with the goal of re-selling the contracts at higher prices sometime in the future. In some embodiments of the present invention, the IP investors may act on behalf of licensors or licensees.

Licensees. Licensees are the ultimate buyers of the IP rights and consumers of the IP trading exchange. Licensees purchase IP licensing in order to practice the invention. In some cases, licensees purchase IP licensing in order to legitimize current operations that may be infringing. In some embodiments of the present invention, the licensee also may serve as the IP investor.

Initial Offering of IP Rights

For purposes of illustration only, an IP trading exchange may be thought of as a hybrid of today's stock and commodities exchanges. For example, the initial offering of rights to a particular IP may be modeled after a stock initial public offering ("IPO") on a traditional stock exchange.

In the first step of an IP initial offering, the IP owner identifies IP that it desires to license. Alternatively, the IP trading exchange and/or an IP investment bank may approach the IP owner to solicit interest in listing the intellectual property rights on the exchange. The IP owner may execute a mutual non-disclosure agreement (mNDA) with the IP trading exchange and/or IP investment bank prior to making a submission. An mNDA allows the IP trading exchange and/or IP investment bank to share confidential information relating to the intellectual property with one or more underwriters that assist with the listing and underwriting process.

The IP owner then submits a schedule of intellectual property to be listed on the IP trading exchange. The IP owner also may submit one or more of the following: a checklist covering key representations and terms from any seller agreement or unitized license contract (including, for instance, field of use, geographical restrictions, whether research was federally funded, among others); any due diligence checklist, including validity opinions and/or analyses such as prior art searches, infringement analyses such as claim charts, encumbrances, and prior licensing experience; descriptions of the technology to the licensed, including expected commercial embodiments in which the technology could be used, and market analyses; any financial information relating to anticipated deals and/or licensing revenues; and any plans for future production of the licensed technology. The IP owner may submit IP to be listed individually on the IP trading exchange as well as IP to be listed together as a pool.

The IP owner then solicits bids from the IP trading exchange and/or IP investment banks to perform the listing and underwriting process. Alternatively, the IP owner may perform the listing and underwriting process itself.

If the IP owner utilizes an IP investment bank, then IP investment banks bid on the listing and underwriting process, and the IP owner selects one of the investment banks, typically the lowest bidder, to carry the process forward. Investment banks typically work out a fee structure for the listing and underwriting process, which may be fixed fees, success or percentage fees based on the success of the IP initial offering, or a combination of both fixed and success fees.

Next, IP trading exchange and/or the selected IP investment bank may begin the due diligence phase of the listing process. As described below, the due diligence phase includes: packaging the IP for listing; performing legal analysis of the strength and ownership of the IP, including validity and noninfringement analyses; performing market analysis of the products and/or parties which may infringe the IP and require or benefit from licensees to the IP, including a determination of the likely market size and market segments; performing valuation analyses, including a determination of the likely range of royalties; and marketing the IP. The due diligence phase may be conducted by the IP owner and/or the IP investment bank. Alternatively, the due diligence phase may be contracted out to lawyers, economists, marketing firms, or other specialists and third parties.

By packaging the IP, the IP owner (or, for example, marketing firms) determine which of the relevant IP should be included in the listing. For instance, an IP owner may only have one patent, and only that patent would be listed. But in instances where the IP owner has numerous IP or multiple related IP, determining which IP should be included in a single listing may require careful consideration. For example, IP may be grouped by product or product group, such as all of the patents and trademarks related to a particular car or line of cars. As another example, IP may be grouped by patent families, such as a parent patent and all patents relating or based on the parent.

In accordance with one embodiment of the present invention, the IP may be pooled such that the unitized license contract that is listed provides for the licensing of a plurality of IP. IP may be placed in a pool according to one or more requirements set by the IP trading exchange and/or the selected IP investment bank. For instance, consideration of whether IP should be included in a particular pool may turn on a consideration of quality and/or valuation metrics relating to the IP and may be permitted based solely upon the IP meeting established threshold values for such metrics. Such metrics may include the Relevance and/or IPQ Scores defined by Ocean Tomo PatentRatings (www.patentratings.com) as generally described in U.S. Pat. Nos. 6,556,992 and 7,657,476 and United States Published Patent Appl. No. 2007-0073748 A1, each of which is incorporated herein by reference. As one example, IP may be placed in a pool based upon a set of relatedness characteristics identified to be statistically more prevalent in the pool based upon a regression analysis of the relatedness of at least two members of the pool. Inclusion of certain IP in a particular pool also may turn on the IP owner, who may petition the IP trading exchange and/or the selected IP investment bank to place certain IP in a particular pool.

The legal analysis of the IP is to determine the strength, or at least an opinion of the strength, of the IP. For instance, with patents, the prior art may be assessed and opinions may be made concerning any possible invalidity issues based on the prior art. Additionally, claim charts may be made and the claims may be construed to determine the patent's scope of coverage. It also may be important to ensure that certain formalities have been followed, such as proper recordation of any assignments, perfection of claims of priority, and/or payment of any annuities or maintenance fees. With, for example, trade secrets, the extent to which the trade secrets have been kept confidential may be assessed, including whether non-disclosure agreements have been used and the extent to which the trade secret has been disclosed, taught, or demonstrated. As another example, with trademarks, a trademark search and/or consumer surveys may be conducted to determine the brand recognition or strength of the mark. Also, it may be important to determine whether formalities have been followed, such as timely filing of statements of use and/or payment of any annuities or maintenance fees.

Valuation of the IP may involve the consideration of numerous factors, such as the strength of the IP, the ability to use or the availability of substitute or competing technologies, the market need for the technology, and/or the market size and number of parties that may be benefit from or require licensing. Also, valuation may depend on the quantity of IP packaged together in the listing. Valuation may require the consideration of economists and lawyers. Additionally, third party ratings or assessments of IP may be helpful in determining the value of the IP.

Upon completion of the due diligence phase, the IP trading exchange and/or IP investment bank determines whether or not the IP should be listed on the IP trading exchange based on the due diligence review. This determination is based on particular underwriting criteria and may further include the determination of an underwriter. As with all risks, some underwriters and investment banks are more conservative than others and may have different standards in evaluating the above factors of the due diligence review. Should the IP trading exchange and/or IP investment bank accept the IP for listing on the IP trading exchange, the IP trading exchange and/or IP investment bank assigns a listing price and provides an estimate of the cash from listing the IP to the IP owner.

At this point, the IP trading exchange and/or IP investment bank may use an underwriter to accept and underwrite the listing and the license contracts. For instance, the underwriter, as lead with an underwriting syndicate or acting alone, may decide to purchase a certain amount of license contracts at a predetermined price as part of an initial sale of the intellectual property rights. The underwriter may execute an mNDA with the IP trading exchange and/or IP investment bank and, in exchange, the IP trading exchange and/or IP investment bank provides the information submitted by the IP owner and any internal analyses or evaluations. The underwriter may perform its own due diligence in analyzing the deal or it may recruit a syndicate. The underwriter also may execute an underwriting agreement with the IP trading exchange and/or IP investment bank.

If the listing price is satisfactory, the IP owner may grant the IP investment bank an exclusive license for the intellectual property with the right to sub-license on a limited (e.g., quantity) non-exclusive basis. In accordance with one embodiment of the present invention, the IP owner may retain a non-exclusive right to practice the IP at no cost or at a reduced cost. In accordance with another embodiment of the present invention, the IP investment bank may obtain an exclusive license in order to have the ability to enforce the IP against infringers. The IP owner may choose to join any enforcement proceedings if desired or if necessary.

The IP trading exchange may issue an offering-memorandum pursuant to and consistent with Rule 144A of the Securities Act of 1933 addressing one or more of the following: a schedule of the intellectual property rights to be listed and the products with which the intellectual property rights may be used pursuant to the license contract; a description of the technology or intellectual property rights to be listed; a description of the market for the listed technology or intellectual property rights; a comparison with other known competing technologies; any pre-existing encumbrances; IP owners' projections on production, if applicable; if an industry-accepted standard exists, any comparison and/or likelihood of adoption as a standard; any validity analyses, risk factors, and any fees; and IP trading exchange rules and disclosures, including underwriting disclosures, IP trading exchange's right to enforce and settlement policies, buyer obligations to report licensing usage, IP trading exchange's right to audit, and any restrictions or policies with respect to resale, sublicensing, and enforcement.

Upon receiving the exclusive license, the IP investment bank may prepare an IP prospectus and/or other marketing materials to attract potential licensees, investors, and/or speculators. These materials likely include information obtained from the due diligence review. For instance, the materials may include: a listing of the IP included in the non-exclusive license; legal analysis of the strength of the IP; the terms of the non-exclusive license contract including the number of units that can be produced and the duration of the contract; the nature of the enforcement actions that may be taken against infringers; portions of the valuation analysis; when and under what terms additional licenses may be made available (e.g., if license contracts trade for more than a certain value for more than a specific number of continuous trading days, a new release of licenses will be made available).

Next, the IP owner and/or IP investment bank prepares for the initial offering of the IP rights. As with stock IPOs, the IP owner and/or IP investment bank seeks to list certain IP license contracts on the IP trading exchange. The initial offering may be based on a certain quantity of IP license contracts, a certain duration for the IP license contracts, or a combination of both quantity and duration.

The IP trading exchange may schedule the date on which the license contracts will first trade and the initial offering price. On the date of the initial trade, the IP trading exchange and/or a clearinghouse, such as the NASDAQ portal or the Depository Trust Clearing Corporation ("DTCC"), will have the number of electronic certificates authorized for the first issue on hand. The IP trading exchange and/or the clearinghouse will disseminate live or realtime license contract trading information, such as the bid or offer and details relating to the last trade. The underwriter will sell through its volume commitment first, and then the IP trading exchange pays a flat fee for each license contract that issues.

Then, the IP trading exchange allows the IP license contracts to be listed on the exchange. The IP license contracts may be listed by members or member firms of the exchange, which may include IP investment banks or other investors. Alternatively, the IP license contracts may be listed by the IP owner.

The IP trading exchange carries out duties which may be similar to current stock exchanges. For example, the IP trading exchange monitors disclosures, guarantees transactions, and clears transactions. The IP trading exchange may monitor and/or enforce any trading regulations, including regulations enacted by the exchange and/or any governmental regulations. Alternatively, this function in whole or in part also may be carried out by IP investment banks.

Additionally, the IP trading exchange may monitor and/or enforce any requirements of listing on the exchange. Alternatively, monitoring and/or enforcing of any listing requirements may be carried out, in whole or in part, by IP investment banks. Listing requirements, which may be created by the exchange, may include considerations such as whether the intellectual property rights have been litigated and, if so, the extent to which they have been litigated; whether competent prior art searches have been conducted; and/or whether any opinions of counsel have been made. Based on listing requirements such as the above, the IP license contracts may be listed separately on the exchange under different types or classes. For example, IP license contracts relating to intellectual property that has been litigated may be classified separately from those contracts relating to intellectual property that has not been litigated. IP contracts which relate to intellectual property that has been litigated may be further classified depending on the extent of litigation. For example, IP contracts relating to intellectual property that has been litigated in district courts and found valid and enforceable may be placed in one class, while IP contracts relating to intellectual property that has been litigated in the Federal Circuit or the Supreme Court may be placed in different classes. Additionally, IP license contracts relating to intellectual property where opinions of counsel have been made may be placed in a class separate from those IP license contracts relating to intellectual property where opinions of counsel have not been made. One or more of the above requirements and/or considerations may be used in listing the IP license contracts on the exchange.

Investors, licensees, and licensors may purchase the IP license contracts from the IP trading exchange. Investors purchase IP license contracts with the goal of seeking appreciation or re-selling at a higher price at some time in the future. In this sense, the IP license contracts are similar to a futures contract. Licensees, on the other hand, purchase the contracts in order to practice the IP or legitimize infringing uses of the IP. In this sense, licensees take delivery of the actual license. With respect to IP license contracts relating to pools of IP, licensees take delivery of licenses to each of the IP contained by the pool. Unused IP license contracts may be re-listed at a later time on the IP trading exchange upon an audit of current operations indicating that the IP is no longer being practiced or is within levels considered acceptable by the license. Further, if future operations require a license and the licensee has sold the license through re-listing, then the licensee will need to acquire a new license from the IP trading exchange in order to resume operations.

In accordance with one embodiment of the present invention, pooled IP that is listed on the IP trading exchange may provide the IP owner with royalties relating to all of the IP contained by the pool. For instance, royalties may be derived based on the number of IP in the pool. As another example, royalties may be derived based on a weighting formula. The weighting formula may assess a royalty for each IP wherein the value of the royalty is based on one or more requirements, such as quality or value metrics. Such metrics may include the Relevance and/or IPQ Scores defined by Ocean Tomo PatentRatings (www.patentratings.com) as generally described in U.S. Pat. Nos. 6,556,992 and 7,657,476 and United States Published Patent Appl. No. 2007-0073748 A1, each of which is incorporated herein by reference.

In accordance with another embodiment of the present invention, the listing IP investment bank may initiate patent infringement actions and other enforcement proceedings against infringers who refuse to purchase licenses through the IP trading exchange. The IP owner may choose to join any enforcement proceedings if desired or if necessary. Excess proceeds from infringement actions may be used by the investment bank to purchase IP license contracts from the IP trading exchange, thereby increasing the price of the contracts and raising the value of the IP.

Day-to-Day Transactions of IP Rights

For purposes of illustration only, an IP trading exchange may be thought of as a hybrid of today's stock and commodities exchanges. For example, day-to-day transactions of rights to a certain listed IP may be modeled after a traditional commodities exchange where contracts are traded on a daily basis. As part of the first step of a typical day-to-day transaction of IP rights, the owner or seller of at least one IP license contract lists the contract and an asking or specified price on the IP trading exchange. The IP license contracts may relate to a specific or individual IP or may relate to a pool containing a plurality of IP. In situations where multiple contracts are owned, the IP license holder may list multiple if not all of the license contracts on the exchange. The IP license holder may perform the listing itself or it may retain an exchange member to perform the listing. The IP license holder may be an investor or speculator who is re-selling the license contract for a higher price. Alternatively, the IP license holder may be a licensee who no longer needs the license, as described below, or is selling excess license contracts. The IP trading exchange and/or third-party networks such as NASDAQ portal host the secondary market, which may be brokered or non-brokered.

Through the IP trading exchange, buyers determine whether or not demand is sufficient to buy the license contract for the IP license holder's specified price as listed on the exchange. If buyers are unwilling to pay the specified price, then the seller retains the license contract until such time when the price becomes more attractive in the market. Alternatively, the seller may lower the asking price to attract a buyer, which may be necessary to sell the license contract if expiration is imminent. With respect to pools of IP, the market prices may reflect or be indicative of the value of the underlying IP considered separately. The inclusion of additional IP in a particular pool may impact market prices based on the value of the additional IP and/or the sum total value of the IP in the pool.

If buyers are willing to pay the specified price, then the sale moves forward towards closing. Typically, an exchange member purchases the license contract on behalf of the buyer at the specified price, and the IP trading exchange clears the transaction. In most any situation, the IP trading exchange monitors any disclosures and guarantees and clears the transaction.

With investors, the buyer may hold the license contract until such time that the price becomes attractive for the buyer to sell the contract. If expiration is imminent, the buyer may be forced to sell the license contract, perhaps even at a discounted price.

In the situation of a licensee or licensor, the buyer may hold the contract beyond expiry and take delivery of the actual license. For instance, a licensee may require the actual license in order to practice the IP or legitimize current operations that may be infringing. Typically, the actual license is delivered by the specialist holding the license.

Where delivery of the actual license has occurred, the holder of the license may only re-list the license upon an audit of current operations indicating that the IP is no longer being practiced or is within levels considered acceptable by the license. Further, if future operations require a license and the licensee has sold the license through re-listing, then the licensee will need to acquire a new license from the IP trading exchange in order to resume operations.

The IP trading exchange retains the right to audit any IP owner at its discretion using an internal or third-party auditing team. For instance, one auditing scenario may require that all buyers that hold license contracts as of the end of a particular quarter must report their license contract usage to the IP trading exchange within a specified amount of time following the quarter-end. The IP trading exchange then reports to the market, through its website or other reporting mediums, the individual usage numbers per buyer (e.g., Buyer A holds 1,200,000 license contracts and has consumed 800,000 as of the most recent quarter-end) and may report the identities of the specific buyers. The IP trading exchange may choose to report usage information only if a buyer is holding more than a specified percentage of the original issue amount of the license contracts. The IP trading exchange also may report other details relating to the status of listed license contracts, such as any supplemental information or material disclosures regarding the technology or intellectual property rights. For instance, the IP trading exchange may announce the filing of a suit against an alleged infringer upon filing of the complaint, as well as the number of license contracts the defendant is alleged to need to remove liability for alleged past infringement.

While contracts are listed on the IP trading exchange, the IP investment bank that initially listed the transaction or its agents may encourage potential licensees to purchase licenses from the exchange. Conducting a licensing and/or marketing campaign often fosters interest in the licenses, which may generate activity in the market and ultimately raise the exchange prices and IP value.

Depending on trading activity, it may be necessary to release additional license contracts. For instance, if license contracts trade for more than a certain value for more than a specific number of continuous trading days, a new release of licenses may be warranted. The initial offering stipulates the conditions under which additional licenses may be released. As with the initial offering, the release of additional licenses may be based on a certain quantity of IP license contracts, a certain duration for the IP license contracts, or a combination of both quantity and duration. For example, the initial offering may stipulate that a release often new licenses is warranted when trading of the existing licenses exceeds $1,000,000 for more than a thirty-day trading period. The second offering of new licenses may stipulate the conditions under which yet another release of new licenses may be warranted. Additional licenses are released in a manner similar to the initial release described above. The new licenses are then bought and sold as described above with respect to day-to-day transactions.

In accordance with one embodiment of the present invention, the IP owner of a pool of IP may wish to include additional IP in the pool. The IP trading exchange and/or the selected IP investment bank may permit the inclusion of additional IP according to one or more requirements. For instance, consideration of whether IP should be included in a particular pool may turn on a consideration of quality and/or valuation metrics relating to the IP and may be permitted based solely upon the IP meeting established threshold values for such metrics. Such metrics may include the Relevance and/or IPQ Scores defined by Ocean Tomo PatentRatings (www.patentratings.com) as generally described in U.S. Pat. Nos. 6,556,992 and 7,657,476 and United States Published Patent Appl. No. 2007-0073748 A1, each of which is incorporated herein by reference. As one example, IP may be placed in a pool based upon a set of relatedness characteristics identified to be statistically more prevalent in the pool based upon a regression analysis of the relatedness of at least two members of the pool. Inclusion of certain IP in a particular pool also may turn on the IP owner, who may petition the IP trading exchange and/or the selected IP investment bank to place certain IP in a particular pool.

In accordance with another embodiment of the present invention, the IP trading exchange, IP investment bank, or their agents may take legal action to require a potential licensee to purchase a license, such as where potential licensee may be infringing the IP and refuses to purchase a license. The IP trading exchange may employ an enforcement committee for investigating allegedly infringing entities and conducting pre-litigation assessments and investigations. The IP owner may choose to join any enforcement proceedings if desired or if necessary. Excess funds generated from any resolution of legal action may be used to purchase licenses from the IP trading exchange, which mitigates the high cost of litigation and, at the same time, increases the price of the contracts and value of the IP.

DETAILED DESCRIPTION OF THE PREFERRED EMBODIMENT

The present invention will now be described more fully with reference to the Figures in which the preferred embodiment of the present invention is shown. The subject matter of this disclosure may, however, be embodied in many different forms and should not be construed as being limited to the embodiment set forth herein.

Referring now to the drawings, wherein like reference numerals designate identical or corresponding parts throughout the several views, FIG. 1 shows the steps of an initial offering of licenses on an IP trading exchange according to one embodiment of the present invention.

Initially, the IP Owner 10 identifies IP that it desires to license. The IP may include patents, copyrights, trademarks, trade dress, and trade secrets. Moreover, the IP may include issued patents, registered copyrights, registered trademarks, or any other granted or registered IP. Additionally, the IP may include pending patent applications, pending trademark applications, or any other pending IP application or registration. The IP license contracts may relate to a specific or individual IP or may relate to a pool containing a plurality of IP. The IP Owner 10 then solicits bids from IP Investment Banks 12 to perform the listing and underwriting process.

The IP Investment Banks 12 then bid on the listing and underwriting process, and the IP Owner 10 selects one of the banks, typically the lowest bidder, to carry the process forward. Investment Banks 12 typically work out a fee structure for the listing and underwriting process, which may be fixed fees, success or percentage fees based on the success of the IP initial offering, or a combination of both fixed and success fees.

The selected IP Investment Bank 12 begins the due diligence phase of the listing process. The due diligence phase may include: packaging the IP for listing; performing legal analysis of the strength and ownership of the IP; performing market analysis of the products and/or parties which may infringe the IP and require or benefit from licensees to the IP; performing valuation analyses; and marketing the IP. The due diligence phase may be conducted by the IP Owner 10 or contracted out to lawyers, economists, marketing firms, or other specialists and third parties.

Upon completion of the due diligence phase, the IP Investment Bank 12 determines whether or not the IP should be listed on the IP Trading Exchange 14 based on the due diligence review. This determination is based on the IP Investment Bank's own underwriting criteria. As with all risks, some banks are more conservative than others and may have different standards in evaluating the above factors of the due diligence review. Should the IP Investment Bank 12 accept the IP for listing on the IP Trading Exchange 14, the IP Investment Bank 12 assigns a listing price and provides an estimate of the cash from listing the IP to the IP Owner 10.

If the listing price is satisfactory, the IP Owner 10 may grant the IP Investment Bank 12 an exclusive license for the intellectual property with the right to sub-license on a limited (e.g., quantity) non-exclusive basis. Additionally, the IP Owner 10 may retain a non-exclusive right to practice the IP at no cost or at a reduced cost. Further, the IP Investment Bank 12 may obtain an exclusive license in order to have the ability to enforce the IP against infringers.

Upon receiving the exclusive license, the IP Investment Bank 12 may prepare an IP prospectus and/or other marketing materials to attract potential licensees, investors, and/or speculators. These materials likely include information obtained from the due diligence review. For instance, the materials may include: a listing of the IP included in the non-exclusive license; legal analysis of the strength of the IP; the terms of the non-exclusive license contract including the number of units that can be produced and the duration of the contract; the nature of the enforcement actions that may be taken against infringers; portions of the valuation analysis; when and under what terms additional licenses may be made available (e.g., if license contracts trade for more than a certain value for more than a specific number of continuous trading days, a new release of licenses will be made available).

Next, the IP Owner 10 and/or the Investment Bank 12 prepares for the initial offering of the IP rights. As with stock IPOs, the Investment Bank 12 seeks to list certain IP license contracts on the IP Trading Exchange 14. The listing of IP license contracts may be based on quantity, duration, or a combination of both.

Then, the IP Trading Exchange 14 allows member firms to list the IP license contracts on the exchange. The IP Trading Exchange 14 carries out duties similar to current stock exchanges. For example, the IP Trading Exchange 14 monitors disclosures, guarantees transactions, and clears transactions.

Speculators and Investors 16 and/or Licensees 18 may purchase the IP license contracts from the IP Trading Exchange 14. Speculators and Investors 16 purchase IP license contracts with the goal of seeking appreciation or re-selling at a higher price at some time in the future. In this sense, the IP license contracts are similar to a futures contract. Licensees 18, on the other hand, purchase the contracts in order to practice the IP or legitimize infringing uses of the IP. In this sense, Licensees 18 take delivery of the actual license. Unused IP license contracts may be re-listed at a later time on the IP Trading Exchange 14 upon an audit of current operations indicating that the IP is no longer being practiced or is within levels considered acceptable by the license. Further, if future operations require a license and the Licensee 18 has sold the license through re-listing, then the Licensee 18 will need to acquire a new license from the IP Trading Exchange 14 in order to resume operations.

The IP Owner 10 of a pool of IP may wish to include additional IP in the pool. The IP Trading Exchange 14 and/or the IP Investment Bank 12 may permit the inclusion of additional IP according to one or more requirements. For instance, consideration of whether IP should be included in a particular pool may turn on a consideration of quality and/or valuation metrics relating to the IP and may be permitted based solely upon the IP meeting established threshold values for such metrics. Such metrics may include the Relevance and/or IPQ Scores defined by Ocean Tomo PatentRatings (www.patentratings.com) as generally described in U.S. Pat. Nos. 6,556,992 and 7,657,476 and United States Published Patent Appl. No. 2007-0073748 A1, each of which is incorporated herein by reference. As one example, IP may be placed in a pool based upon a set of relatedness characteristics identified to be statistically more prevalent in the pool based upon a regression analysis of the relatedness of at least two members of the pool. Inclusion of certain IP in a particular pool also may turn on the IP Owner 10, who may petition the IP Trading Exchange 14 and/or the IP Investment Bank 12 to place certain IP in a particular pool.

The listing IP Investment Bank 12 may initiate patent infringement actions and other enforcement proceedings against infringers who refuse to purchase licenses through the IP Trading Exchange 14. The IP Owner 10 may choose to join any enforcement proceedings if desired or if necessary. Excess proceeds from infringement actions may be used by the Investment Bank 12 to purchase IP license contracts from the IP Trading Exchange 14, thereby increasing the price of the contracts and raising the value of the IP.

Figure 2:
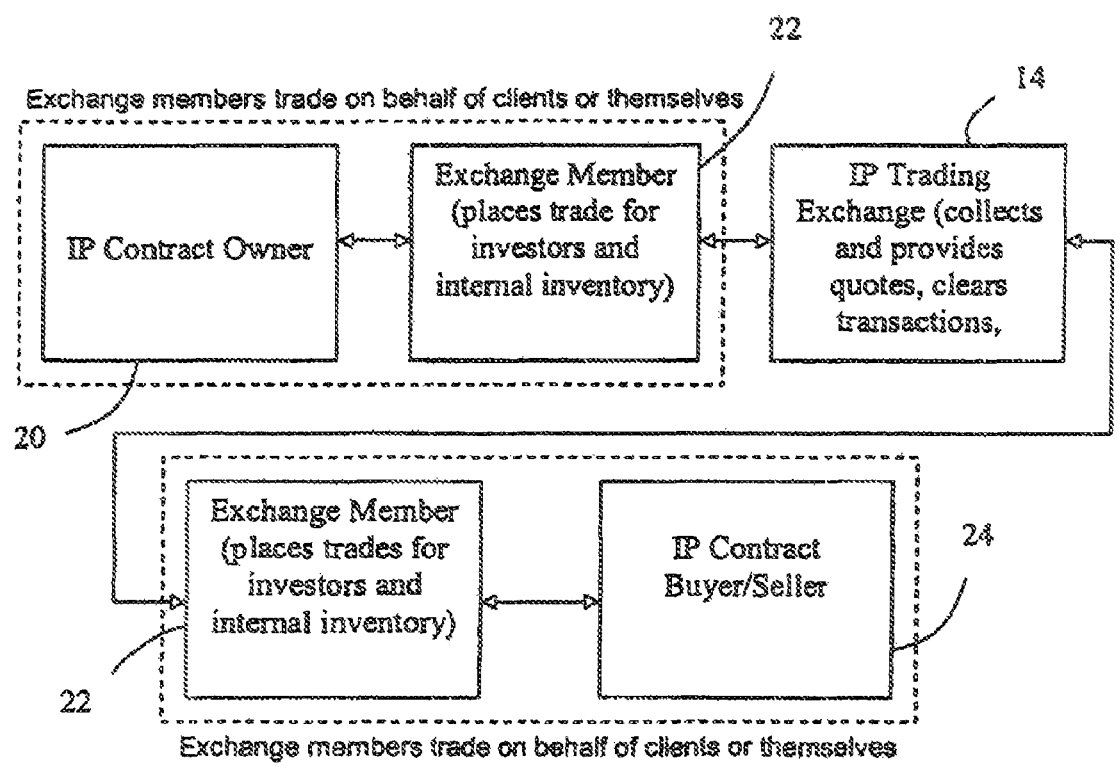
FIG. 2 shows typical day-to-day transactions on an embodiment of a computerized intellectual property trading exchange of the present invention.

FIG. 2 shows typical day-to-day transactions on an IP trading exchange according to one embodiment of the present invention.

As part of the first step of a typical day-to-day transaction of IP rights, the IP Contract Owner 20 of at least one IP license contract lists the contract and an asking or specified price on the IP Trading Exchange 14. In situations where multiple contracts are owned, the IP Contract Owner 20 may list multiple if not all of the license contracts on the exchange. The IP Contract Owner 20 may perform the listing itself or it may retain an Exchange Member 22 to perform the listing. The IP Contract Owner 20 may be an investor or speculator who is re-selling the license contract for a higher price. Alternatively, the IP Contract Owner 20 may be a licensee who no longer needs the license, as described below, or is selling excess license contracts.

Through the IP Trading Exchange 14, buyers determine whether or not demand is sufficient to buy the license contract for the IP Contract Owner's specified price as listed on the exchange. If buyers are unwilling to pay the specified price, then the IP Contract Owner 20 retains the license contract until such time when the price becomes more attractive in the market. Alternatively, the IP Contract Owner 20 may lower the asking price to attract a buyer, which may be necessary to sell the license contract if expiration is imminent.

If a Buyer 24 is willing to pay the specified price, then the sale moves forward towards closing. Typically, an Exchange Member 22 purchases the license contract on behalf of the Buyer 24 at the specified price, and the IP Trading Exchange 14 clears the transaction. In most any situation, the IP Trading Exchange 14 monitors any disclosures and guarantees and clears the transaction.

When the Buyer 24 is an investor or speculator, the Buyer 24 may hold the license contract until such time that the price becomes attractive for the Buyer 24 to sell the contract. If expiration is imminent, the Buyer 24 may be forced to sell the license contract, perhaps even at a discounted price.

When the Buyer 24 is a licensee, the Buyer 24 may hold the contract beyond expiry and take delivery of the actual license. For instance, a licensee may require the actual license in order to practice the IP or legitimize current operations that may be infringing. Typically, the actual license is delivered by the specialist holding the license.

Where delivery of the actual license has occurred, the holder of the license may only re-list the license upon an audit of current operations indicating that the IP is no longer being practiced or is within levels considered acceptable by the license. Further, if future operations require a license and the licensee has sold the license through re-listing, then the licensee will need to acquire a new license from the IP Trading Exchange 14 in order to resume operations.

While contracts are listed on the IP Trading Exchange 14, the IP investment bank that initially listed the transaction or its agents may encourage potential licensees to purchase licenses from the exchange. Conducting a licensing and/or marketing campaign often fosters interest in the licenses, which may generate activity in the market and ultimately raise the exchange prices and IP value.

Depending on trading activity, it may be necessary to release additional license contracts. For instance, if license contracts trade for more than a certain value for more than a specific number of continuous trading days, a new release of licenses may be warranted. The initial offering stipulates the conditions under which additional licenses may be released. For example, the initial offering may stipulate that a release often new licenses is warranted when trading of the existing licenses exceeds $1,000,000 for more than a thirty-day trading period. The second offering of new licenses may stipulate the conditions under which yet another release of new licenses may be warranted. Additional licenses are released in a manner similar to the initial release described above. The new licenses are then bought and sold as described above with respect to day-to-day transactions.

Additionally, the investment bank or its agents may take legal action to require a potential licensee to purchase a license, such as where potential licensee may be infringing the IP and refuses to purchase a license. The IP owner may join any enforcement proceedings if desired or if necessary. Excess funds generated from any resolution of legal action may be used to purchase licenses from the IP trading exchange, which mitigates the high cost of litigation and, at the same time, increases the price of the contracts and value of the IP.

Figure 3:
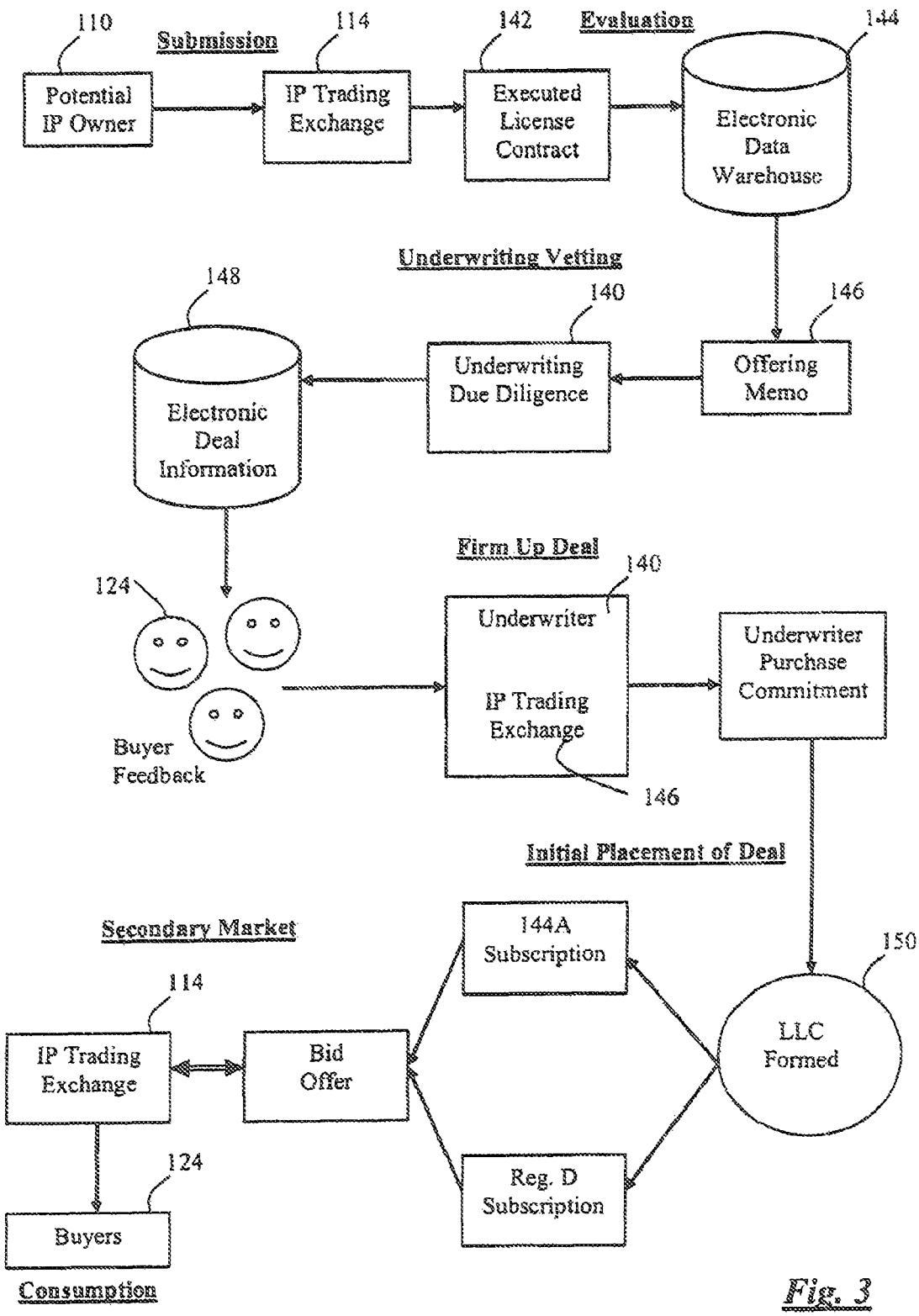
FIG. 3 is a diagram showing certain steps during the life-cycle of another embodiment of an unitized license contract of the present invention.

FIG. 3 shows certain steps during the lifecycle of another embodiment of an unitized license contract of the present invention. As shown in FIG. 3, a potential IP Owner 110 may execute a mutual non-disclosure agreement (mNDA) with the IP Trading Exchange 114 prior to making a submission. An mNDA allows the IP Trading Exchange 114 to share confidential information relating to the intellectual property with one or more Underwriters 140 that assist with the listing and underwriting process. The IP Owner 110 then submits a schedule of intellectual property to be listed on the IP Trading Exchange 114. The IP Owner 110 also may submit one or more of the following: a checklist covering key representations and terms from any seller agreement or unitized license contract (including, for instance, field of use, geographical restrictions, whether research was federally funded, among others); any due diligence checklist, including validity opinions and/or analyses such as prior art searches, infringement analyses such as claim charts, encumbrances, and prior licensing experience; descriptions of the technology to the licensed, including expected commercial embodiments in which the technology could be used, and market analyses; any financial information relating to anticipated deals and/or licensing revenues; and any plans for future production of the licensed technology.

The IP Trading Exchange 114 evaluates the intellectual property submission of the IP Owner 110 and determines whether to move forward with the due diligence and underwriting processes. If the IP Trading Exchange 114 decides to move forward, then the IP Owner 110 enters into a license contract 142 with the IP Trading Exchange 114 and/or members of the IP Trading Exchange 114. At this point, information relating to the intellectual property and the IP Owner 110 is stored in an electronic data warehouse or database 144 that is maintained by or for the IP Trading Exchange 114.

The IP Trading Exchange 114 may issue an offering memorandum 146 pursuant to and consistent with Rule 144A of the Securities Act of 1933 addressing one or more of the following: a schedule of the intellectual property rights to be listed and the products with which the intellectual property rights may be used pursuant to the license contract 142; a description of the technology or intellectual property rights to be listed; a description of the market for the listed technology or intellectual property rights; a comparison with other known competing technologies; any pre-existing encumbrances; projections by IP Owner 110 on production, if applicable; if an industry-accepted standard exists, any comparison and/or likelihood of adoption as a standard; any validity analyses, risk factors, and any fees; and IP Trading Exchange rules and disclosures, including underwriting disclosures, IP Trading Exchange's right to enforce and settlement policies, buyer obligations to report licensing usage, IP Trading Exchange's right to audit, and any restrictions or policies with respect to resale, sublicensing, and enforcement.

The IP Trading Exchange 114 may distribute the offering memorandum 146 to one or more Underwriters 140, working alone or as part of a syndicate. The Underwriter 140 carries out the due diligence and underwriting processes. Based on the evaluations of the intellectual property by the Underwriter 140, the Underwriter may chose to accept the license contracts and begin soliciting interest of potential Buyers 124. The Underwriter 140 may solicit commitments from one or more Buyers 124, which will assist the Underwriter in finning up the pricing of the initial sale of the intellectual property license contracts. The Underwriter 140 may further commit with potential Buyers 124 on certain terms on volume and discounts relating to the initial sale. Information relating to these initial deals and buyer commitments may be stored in an electronic deal information database 148, which is maintained by or for the Underwriter 140 and/or the IP Trading Exchange 114.

Upon completion of the underwriting process, the Underwriter 140 and IP Trading Exchange 114 firm up the deal and prepare for the initial sale. The IP Trading Exchange 114 may schedule a date on which the license contracts 142 will first trade and the initial price. On the date of the initial sale, the IP Trading Exchange 114 and/or a clearinghouse, such as the NASDAQ portal or Depository Trust Clearing Corporation ("DTCC"), will have the number of electronic certificates authorized for the first issue on hand. The IP Trading Exchange 114 and/or the clearinghouse will disseminate live or realtime license contract trading information, such as the bid or offer and details relating to the last trade. The Underwriter 140 will sell through its volume commitment first, and then the IP Trading Exchange 114 pays a flat fee for each license contract 142 that issues.

The initial sale may be structured to comply with either Rule 144A ("144A") or Regulation D ("Reg. D") of the Securities Act of 1933. The Underwriter 140 may set up a separate limited liability company 150 or other corporate vehicle to issue the initial sale of license contracts, and the license contracts may be issued under either 144A or Reg. D. For instance, the limited liability company 150 may issue a first set or subscription of initial license contracts under 144A that may be offered for sale through the NASDAQ portal, the DTCC, or other clearinghouse. At the same time, the limited liability company 150 may issue a second set or subscription of initial license contracts under Reg. D that may be offered for sale through an in-house trading platform, such as a trading platform operated by the IP Trading Exchange 114. Two alternative secondary markets may exist for trading the license contracts, one under 144A and the other under Reg. D.

After the secondary market develops, in which license contracts 142 are regularly traded with Buyers 124, the IP Trading Exchange 114 may engage in oversight, auditing, reporting, and/or enforcement functions. The IP Trading Exchange 114 may engage in oversight functions to be sure that license contracts are properly traded pursuant to 144A, Reg. D., or other federal securities regulations and rules. The IP Trading Exchange 114 also may engage in auditing functions to be sure that Buyers 124 are accurately representing their licensing usage and are no exceeding the scope or quantity of the license contract. The IP Trading Exchange 114 also may engage in reporting functions to provide the market with realtime market prices and related data, or to announce the filing of enforcement proceedings or litigation relating to the license contracts. The IP Trading Exchange 114 also may undertake enforcement functions and carry out enforcement proceedings, including infringement litigation, when recalcitrant buyers refuse to purchase licenses or a sufficient number of licenses.

Many changes and modifications will occur to those skilled in the art upon studying this description. All such changes and modifications which are within the spirit of the invention are intended to be included within the scope of the claims.

What is claimed is:

1. A computerized intellectual property trading exchange for facilitating the trading of intellectual property rights, said computerized exchange comprising:
   a computerized storage device configured to store at least one unitized intellectual property license contract, said at least one unitized license contract relating to a pool containing intellectual property rights placed in said pool based upon a set of relatedness characteristics identified to be statistically more prevalent in said pool based upon a regression analysis of at least two members of said pool, said at least one unitized license contract comprising the right to practice said pool of intellectual property rights for a predetermined quantity of instances;
   a computer-accessible forum, said computer-accessible forum defining at least one regulation of trading and at least one requirement of listing on said computerized exchange, said computer-accessible forum configured to allow a plurality of participants to trade said at least one unitized license contract, said plurality of participants comprising:
     at least one seller, said at least one seller having said at least one unitized license contract, said at least one seller desiring to sell said at least one unitized license contract;
     at least one underwriter, said at least one underwriter desiring to purchase said at least one unitized license contract for resale through said computer-accessible forum; and
     at least one buyer, said at least one buyer desiring to obtain said at least one unitized license contract through said computer-accessible forum.

2. The computerized intellectual property trading exchange of claim 1 wherein placing said intellectual property into said pool is further based on the quality of said intellectual property.

3. The computerized intellectual property trading exchange of claim 2 wherein said quality is determined by a regression analysis of characteristics of at least one member of said pool.

4. The computerized intellectual property trading exchange of claim 1 wherein placing said intellectual property into said pool is further based on the value of said intellectual property.

5. The computerized intellectual property trading exchange of claim 1 wherein placing said intellectual property into said pool is further based on the relevance of said intellectual property to an industry or business.

6. The computerized intellectual property trading exchange of claim 5 wherein said relevance is determined by a regression analysis of characteristics of at least one member of said pool.

7. The computerized intellectual property trading exchange of claim 1 wherein placing said intellectual property into said pool is further based on a metric relating to said intellectual property.

8. The computerized intellectual property trading exchange of claim 7 wherein said metric comprises a score or ranking.

9. The computerized intellectual property trading exchange of claim 8 wherein said score or ranking is determined by a regression analysis of characteristics of at least one member of said pool.

10. The computerized intellectual property trading exchange of claim 1 wherein said buyer gains rights to each of said intellectual property rights contained by said pool.

11. The computerized intellectual property trading exchange of claim 1 wherein said seller receives royalties for each of said intellectual property rights contained by said pool.

12. The computerized intellectual property trading exchange of claim 11 wherein said royalties are attributed to at least one member of said pool based upon a regression analysis of the quality of said at least one member.

13. The computerized intellectual property trading exchange of claim 11 wherein said royalties are attributed to at least two members of said pool based upon a regression analysis of the relatedness of said at least two members.

14. A computer-implemented method for trading at least one unitized license contract relating to a pool of intellectual property rights by at least one seller to at least one buyer through a computer-accessible intellectual property exchange, said method comprising the steps of:
   storing in a computerized storage device information describing said at least one seller having said at least one unitized license contract relating to said pool containing intellectual property rights placed in said pool based upon a set of relatedness characteristics identified to be statistically more prevalent in said pool based upon a regression analysis of at least two members of said pool;

storing in a computerized storage device information describing at least one underwriter desiring to obtain said at least one unitized license contract for resale on said computer-accessible intellectual property exchange by storing in said computerized storage device information describing licenses to practice said pool of intellectual property for a predetermined quantity of instances;

storing in said computerized storage device information describing said at least one buyer purchasing said at least one unitized license contract through said computer-accessible intellectual property exchange; and processing in a microprocessor the clearing of said purchase by said buyer of said at least one unitized license contract.

15. The method of claim 14 wherein placing said intellectual property into said pool is further based on the quality of said intellectual property.

16. The method of claim 15 wherein said quality is determined by a regression analysis of characteristics of at least one member of said pool.

17. The method of claim 14 wherein placing said intellectual property into said pool is further based on the value of said intellectual property.

18. The method of claim 14 wherein placing said intellectual property into said pool is further based on the relevance of said intellectual property to an industry or business.

19. The method of claim 18 wherein said relevance is determined by a regression analysis of characteristics of at least one member of said pool.

20. The method of claim 14 wherein placing said intellectual property into said pool is further based on a metric relating to said intellectual property.

21. The method of claim 20 wherein said metric comprises a score or ranking.

22. The method of claim 21 wherein said score or ranking is determined by a regression analysis of characteristics of at least one member of said pool.

23. The method of claim 14 wherein said step of clearing further comprises payment of royalties to said seller.

24. The method of claim 23 wherein said royalties are attributed to at least one member of said pool based upon a regression analysis of the quality of said at least one member.

25. The method of claim 23 wherein said royalties are attributed to at least two members of said pool based upon a regression analysis of the relatedness of said at least two members.

26. A computer-implemented method for trading at least one unitized license contract relating to a pool of intellectual property rights by at least one seller to at least one buyer through a computer-accessible intellectual property exchange, said method comprising the steps of:

storing in a computerized storage device information describing said at least one seller having said pool containing intellectual property rights placed in said pool based upon a set of relatedness characteristics identified to be statistically more prevalent in said pool based upon a regression analysis of at least two members of said;

storing in a computerized storage device information describing said at least one unitized license contract between said at least one seller and said computer-accessible intellectual property exchange, said at least one unitized license contract relating to said pool of intellectual property rights;

storing in a computerized storage device information describing at least one underwriter desiring to obtain said at least one unitized license contract for resale on said computer-accessible intellectual property exchange by storing in said computerized storage device information describing licenses to practice said pool of intellectual property for a predetermined quantity of instances;

processing in a microprocessor a listing on said computer-accessible intellectual property exchange of said at least one unitized license contract;

storing in said computerized storage device information describing said at least one buyer purchasing said at least one unitized license contract through said computer-accessible intellectual property exchange; and processing in a microprocessor the clearing of said purchase by said buyer of said at least one unitized license contract.

27. The method of claim 26 wherein placing said intellectual property into said pool is further based on the quality of said intellectual property.

28. The method of claim 27 wherein said quality is determined by a regression analysis of characteristics of at least one member of said pool.

29. The method of claim 26 wherein placing said intellectual property into said pool is further based on the value of said intellectual property.

30. The method of claim 26 wherein placing said intellectual property into said pool is further based on the relevance of said intellectual property to an industry or business.

31. The method of claim 30 wherein said relevance is determined by a regression analysis of characteristics of at least one member of said pool.

32. The method of claim 26 wherein placing said intellectual property into said pool is further based on a metric relating to said intellectual property.

33. The method of claim 32 wherein said metric comprises a score or ranking.

34. The method of claim 33 wherein said score or ranking is determined by a regression analysis of characteristics of at least one member of said pool.

35. The method of claim 26 wherein said step of clearing further comprises payment of royalties to said seller.

36. The method of claim 35 wherein said royalties are attributed to at least one member of said pool based upon a regression analysis of the quality of said at least one member.

37. The method of claim 35 wherein said royalties are attributed to at least two members of said pool based upon a regression analysis of the relatedness of said at least two members.

* * * * *